United States Patent [19]

Pulick et al.

[11] 4,154,055
[45] May 15, 1979

[54] INDIRECT BRAYTON ENERGY RECOVERY SYSTEM

[75] Inventors: Michael A. Pulick, Livonia; Armen Topouzian, Birmingham, both of Mich.

[73] Assignee: Ford Motor Company, Dearborn, Mich.

[21] Appl. No.: 781,375

[22] Filed: Mar. 25, 1977

[51] Int. Cl.$^2$ ............................................. F02C 7/00
[52] U.S. Cl. ................................... 60/39.5; 266/141
[58] Field of Search ............... 60/39.02, 39.5, 39.52, 60/39.51 R; 266/141, 159

[56] References Cited

U.S. PATENT DOCUMENTS

| | | | |
|---|---|---|---|
| 2,131,031 | 9/1938 | Avery | 266/141 |
| 2,541,532 | 2/1951 | Mosser | 60/39.52 |
| 3,369,361 | 2/1968 | Craig | 60/39.5 |
| 3,449,548 | 4/1976 | Lockwood | 60/39.52 |

Primary Examiner—Louis J. Casaregola
Attorney, Agent, or Firm—Joseph W. Malleck; Olin B. Johnson

[57] ABSTRACT

An indirect Brayton cycle is employed for an energy recovery system useful for large mass flow applications, such as a cast-iron making cupola. Exhaust gases from the cupola (elevated in temperature due to conversion by burning to $CO_2$ and due to elimination of cooling of the exhaust passages) are directed to a turbine (which extracts energy to drive a compressor and electrical generator), the exhaust gases are then expanded (reduced in pressure), passed through a heat exchanger to release additional heat units to an air supply feeding the cupola, and then through the compressor to be raised in pressure to ambient for dumping. The exhaust gases are roughly filtered prior to entry into the recovery system and fine filtered after leaving the system prior to dumping; the residual temperature of the fine filtered exhaust gases is about 390° F.

In contrast, the direct Brayton cycle employed by the prior art for energy recovery (steam plants) conveys a fresh air supply to a compressor-turbine-generator combination, first raising the pressure and temperature of the air supply by the compressor, then passing the air supply through a heat exchanger for an additional temperature increase (receiving heat units from a trailing portion of the steam system) and then passing the air supply through a turbine for return to ambient pressure conditions with a residual heat content of about 850° F.

4 Claims, 3 Drawing Figures

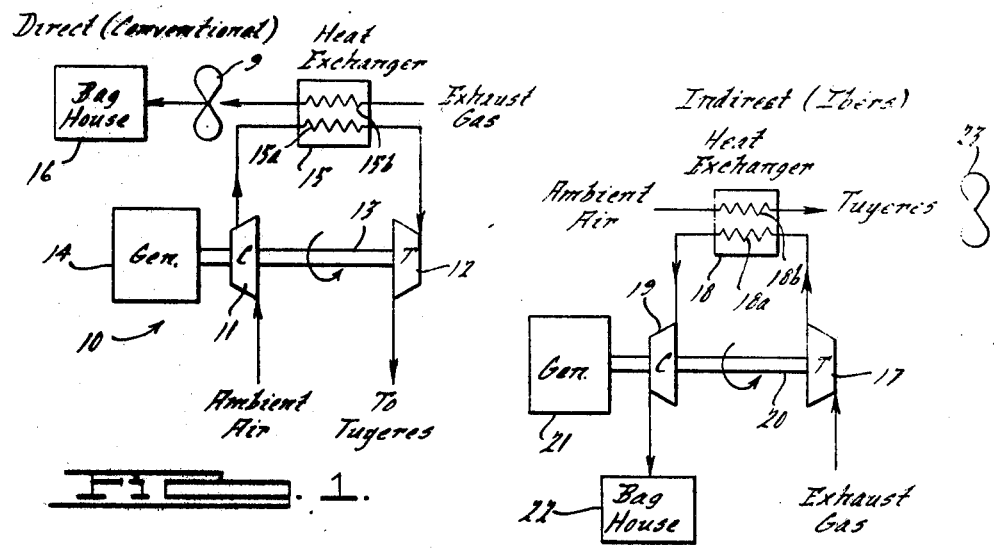
FIG. 1.
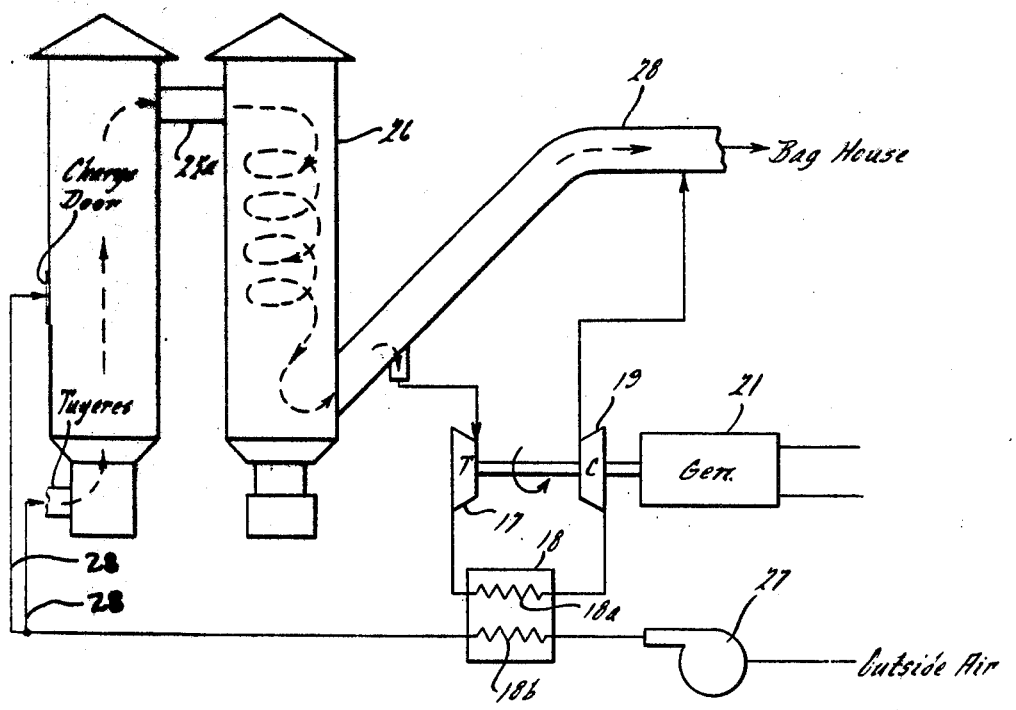
FIG. 2.
FIG. 3.

INDIRECT BRAYTON ENERGY RECOVERY SYSTEM

BACKGROUND OF THE INVENTION

The necessity for recovering waste heat energy from a variety of different furnace or engine types is becoming more acute. Prior art recovery systems have used principally two forms (a) a boiler system which absorbs heat units from hot exhaust gases, the heated water then being distributed for a variety of functional uses, and (b) pressurization of the heated exhaust gases so that the pressurized gases may drive mechanical equipment for extracting rotary mechanical energy. Both of these forms have proved to be expensive and have not obtained the degree of efficiency desired.

With respect to pressurization, one specific mode has utilized a Brayton cycle. A Brayton cycle is one which is comprised ideally of two adiabatic and two isobaric cycles, each alternated in sequence. Brayton cycle energy recovery systems have been utilized in industrial plants having furnaces giving off large volumes of hot gases, such as a steam system for a utility company. The known Brayton cycle system employs a compressor-heat exchanger-turbine combination. The compressor is initially driven by an exterior power source and later by the turbine; ambient air is introduced to the compressor, elevated in pressure, then transmitted through a heat exchanger which has been supplied with heat units from the furnace hot gases. The compressed heated air is then used to drive a turbine which in turn drives an electrical generator and the compressor. The spent compressed air is then mixed with ambient air for purposes of providing a preheated air supply to the furnace. The furnace exhaust gases, having passed through the heat exchanger, are then passed through a filtering system and returned to ambient air.

Several problems are associated with a direct Brayton cycle system including: (a) in the event a component of the compressor-heat exchanger-turbine apparatus fails, the furnace system is without an adequate supply of air irrespective of whether the air is heated or not heated and thus the furnace cannot be operated, (b) there is insufficient waste energy recovery principally limited by the maximum temperature of the materials employed to construct the heat exchanger, (c) the direct system experiences considerable leakage and significant exhaust gas back pressure contributing to low efficiency and may encourage toxic gases to enter the surrounding plant, (d) although the Direct Brayton Cycle has never been used for Cupola energy recovery, if it were to be so used, the high temperature of exhaust gases carried to the system would require the use of costly cooling equipment to reduce the temperature of the exhaust gases to a workable temperature for the heat exchanger (i.e. 1300° F.), (e) the outlet temperature of the exhaust gases after having passed through the direct system is high contributing to a destruction a filtering system downstream thereof, (f) the direct system requires an unduly large heat exchanger to accommodate large furnace applications, and (g) the direct system is difficult to service.

SUMMARY OF THE INVENTION

A primary object of this invention is to provide an improved and more efficient waste energy recovery system which solves one or more of the above problems, such system being particularly useful in a variety of applications ranging from large capacity applications to small light weight portable systems.

Another object of this invention is to provide an energy recovery system that is useful and reliable for industrial furnaces, in that the system increases the longevity of components, and, in particular, the system is useful with iron making and glass making furnaces allowing the associated heat exchanger to be operated without danger of destruction of the exchanger materials while allowing for high mass movement.

Yet another object of this invention is to provide a heat recovery system that will efficiently recover heat units from exhaust gases and permit such recovery units to be employed both for preheating induction air to operate a furnace (thereby eliminating the necessity for natural gas consumption) and for generating electricity (again displacing the need for use of natural products). It is desirous to provide a better energy recovery system that meets the needs of revised environmental and anti-pollution standards, and eliminates the need for fuels in short supply, such as natural gas.

Still another object of this invention is to provide a heat recovery system that is easy to service and will operate with highly contaminated exhaust gases having abrasive particles therein.

Finally, it is an object of this invention to provide a heat recovery system that employs a unique thermodynamic air cycle.

Features pursuant to the above objects comprise the (a) reversal of the normal Brayton cycle with exhaust gases being directed first to a turbine so that they may be expanded and assume a sub-atmospheric pressure condition; (b) expanded gases are then subjected to a heat exchanger whereby heat units are extracted and transferred to ambient air on its way to support combustion in a furnace; and (c) the expanded and cooled gases are thence sucked by a compressor and elevated to ambient pressure conditions for dumping. The compressor and turbine are coupled together by a common shaft, the common shaft providing direct mechanical horsepower or is connected to an electrical generator for generating electricity by virtue of the rotary power initiated by such thermodynamic cycling.

SUMMARY OF THE DRAWINGS

FIGS. 1 and 2 are a schematic diagram of Brayton type heat recovery cycles, the system illustrated in FIG. 1 is direct and characteristic of the prior art, while the system in FIG. 2 is indirect and characteristic of the present invention;

FIG. 3 is a schematic diagram of one application of this invention employing an indirect Brayton cycle system for use with an iron making furnace.

DETAILED DESCRIPTION

In a direct Brayton cycle energy recovery system 10 as shown in FIG. 1, consistent with the prior art, a compressor 11 and turbine 12, of conventional construction, are coupled together by a common shaft 13, said shaft extending to a generator 14 for driving same. Ambient air is delivered to the inlet of the compressor 11, raised in pressure and temperature and then passed through passages 15a of a heat exchanger 15 prior to being delivered to the turbine 12. The heat exchanger 15 transfers heat from waste exhaust gases, (such as taken from a furnace operation) passing through passages, 15b, to the compressed ambient air by conventional heat exchange apparatus. Since typical heat exchange materials are limited for life-fatigue conditions to accept gases at or cooler than 1300° F., some mechanism upstream from the heat exchanger must be used to cool the exhaust gases to the tolerable range.

After the compressed and heated ambient air is passed through the turbine, it is reduced in temperature and expanded to ambient pressure conditions. The spent gases having exited from the turbine can be sent to a station to mix and preheat an air supply for such purposes as a furnace operation. The exhaust gases having been passed through the heat exchanger 15, are forced (as by blower 9) to a filtering system 16; if the cooled exhaust gases are low enough in temperature, the filtering system can be a baghouse.

Turning to FIG. 2, the Brayton cycle is reversed according to this invention. The inventive system accepts exhaust gases at a considerably higher temperature, such as at least 100° F. higher, and delivers the hot exhaust gases directly to a turbine 17 of a Brayton cycle apparatus. The exhaust gases are expanded by virtue of having passed through the turbine 17 and reduced in pressure from ambient pressure. The slightly cooled and expanded gases are then conveyed through first passages 18a of a heat exchanger 18 which transmits heat units to ambient air passing through adjacent second passages 18b. The cooled exhaust gases are then transmitted to a compressor 19 by suction and elevated in pressure to ambient conditions. As a result of the compression, exhaust gases are slightly elevated in temperature to a level which is compatible with operation of a filtering system such as a baghouse 22. The exhaust gases are eventually dumped to ambient conditions after filtering. The electrical generator 21 is coupled to shaft 20 which commonly connects the compressor 19 and turbine 17. Mechanical energy is extracted from the rotary movement of the compressor and turbine to generate a predetermined supply of electricity.

The extracted heat units are used to warm the ambient air passing through passages 18b, such heated air can then be carried to mix with ambient air for providing a preheated air supply for such purposes as injection in the tuyeres of a cupola or equivalent furnace.

Several advantages are apparent from the reversal of the Brayton cycle, as depicted in FIG. 2. Much higher exhaust gas temperatures are accepted by the energy recovery system and yet the temperature of the gases exposed to the heat exchanger is considerably lower than that required of the prior art thereby reducing the physical metal requirements for the heat exchanger. A disadvantage of the prior art is that containment of the pressurized air in the conventional direct Brayton cycle system is more difficult; however, in the indirect Brayton cycle system, the exhaust gases are essentially sucked through the compressor-turbine combination and are reduced in pressure for much of the cycle, thereby making the containment of the gases much easier. Accordingly, leakage is reduced and considerable exhaust gas back pressure is eliminated.

Yet still another unobvious advantage is that the air supply, required to be supplied to the furnace for furnace operation or for use with auxialiary equipment, is direct. In that sense, a failure of the indirect Brayton cycle system has no limitation or effect upon continuing a supply of the ambient air to the furnace or auxiliary equipment.

A most important economic advantage of the indirect Brayton recovery system is the reduction of capital costs for a total system, particularly in the area of eliminating the necessity for cooling equipment to reduce the temperature of exhaust gases delivered to the recovery system, since the recovery system can handle much hotter gases. In addition, the exhaust gases, when eliminated from the Brayton cycle system, are at a much lower temperature as permitted by the inventive system preventing early destruction of a filtering system or baghouse arrangement associated therewith. Moreover, the size and capacity of the heat exchanger required for the indirect Brayton system is considerably reduced resulting in capital savings and reduction of valuable space required to house the system.

Turning to FIG. 3, a schematic layout is presented for application of the indirect Brayton energy cycle system to a cupola furnace 25, typical for making cast iron. Exhaust gases, at or slightly above 1400° F., are drawn from the top of the cupola 25 (such as at 25a) or from the downcomer 26 (which acts as a filter). The downcomer-filter 26 operates by the momentum change principle (abrupt changes in direction of gas) to eliminate particles 10 microns or larger from the gases. If greater particulate removal is necessary, a second filter would be employed, such as to eliminate particles to 5 microns (an electrostatic filter may be used in this second stage). The filtered exhaust gases are then directed to the turbine 17 and expanded to a desired pressure of about 7.3 psia. The expanded gases will have a slightly lower temperature at about 1160° F.

The expanded exhaust gases are then transmitted through a heat exchanger 18. The heat exchanger may be comprised of ceramic plys which define a set of said first passages 18a receiving the exhaust gases; interleaved therewith is a set of second passages 18b through which ambient air may be passed in heat exchange relationship. The ceramic-glass plys may be formed in accordance with conventional heat exchanger structure such as that manufactured by Corning Glass. The heat exchanger is preferably of the counterflow fixed type and typically will have a general overall dimension of approximately 12 ft. in its maximum dimension assuming the cupola exhaust gases have a mass flow of approximately 10–70 lbs./sec. Ambient air delivered to the heat exchanger is driven by a blower 27, typically at a rate of about 10–70 lbs./sec. The cooled expanded exhaust gases are directed through compressor 19 and then to a baghouse for dumping. The warmed ambient air is mixed with fresh air in tuyeres 28 for delivery to the furnace.

The various temperatures and some pressure conditions achieved within an energy recovery system adapted for a cupola are as follows, comparing both a prior system according to FIG. 1 and the inventive system according to FIGS. 2 and 3:

| | Prior Art System | | | | | |
|---|---|---|---|---|---|---|
| | Ambient Gas Flow Thru Compressor-Turbine | | | | Exhaust Gas Flow | |
| | Into Compressor | Out of Compressor | Out of Heat Exchanger into Turbine | Out of Turbine | Into Heat Exchanger | Out of Heat Exchanger |
| Temperature | Ambient | 236° F. | 1089° F. | 842° F. | 1300° F. | 450° F. |
| Pressure | Ambient | 29.4 psia | 27.7 psia | 4.7 psia | 14.7 psia | 14.5 psia |
| Mass Flow | 12 lb/sec. | same | same | same | 70 lb/sec | same |

| | Inventive System | | | | | |
|---|---|---|---|---|---|---|
| | Exhaust Gas Flow Thru Compressor-Turbine | | | | Ambient Gas Flow to Tuyeres | |
| | Into Turbine | Out of Turbine into Heat Exchanger | Out of Heat Exchanger into Compressor | Out of Compressor | Into Heat Exchanger | Out of Heat Exchanger |
| Temperature | 1400° F. | 1158° F. | 230° F. | 390° F. | Ambient | 940° F. |
| Pressure | 14.7 | 7.3 psia | 7.0 psia | 14.7 psia | Ambient | 14.5 psia |
| Mass Flow | 70 lb/sec. | same | same | same | 42 lb./sec. | same |

The turbine-compressor apparatus may be built according to design disclosed in "Principles of Turbomachinery" by Shepherd, D. G., published by MacMillan Co., N.Y. 1956. The electrical generator may be constructed according to known information disclosed in "Basic Electrical Engineering" by A. E. Fitzgerald et.al., published by McGraw Hill Book Co., Inc., 1957. The heat exchanger may be constructed according to information disclosed in "Heat Exchangers, Applications to Gas Turbines" by Hrynizak in Butterworths Scientific Publications, London, 1958, and in "Compact Heat Exchangers" by Kayo, W. M. and London A. L., published by McGraw-Hill Book Co., Inc., N.Y., 1958. The filter and baghouse may be constructed according to information disclosed in "Design of Industrial Exhaust Systems" by Alden, I. L. and Kane, J. M., published by Industrial Press, Inc. N.Y., 1970. The disclosed information in the above references pertinent to the present invention are incorporated by reference.

The energy utilization for such a cupola recovery system provides approximately a 78% efficiency, with 7% of heat units being extracted for conversion to electrical energy, and a 71% of heat units being extracted for preheating air delivered to the cupola for operation. Efficiencies for prior art recovery systems are considerably lower.

We claim:

1. An indirect Brayton energy recovery system useful for extracting and converting heat units from the hot combusted exhaust gases of a furnace, the furnace being operable independently of said recovery system except for selective recovery of heat units through said recovery system, the furnace requiring a supply of heated air for proper operation, the system comprising:

(a) means providing a compressor and turbine coupled together along a common shaft for joint rotative actuation, (b) an electrical generator drivingly connected to said common shaft for being driven, (c) a heat exchange mechanism having independent flow passages, first ones of said flow passages being effective for carrying ambient gases, and second ones of said passages being effective for receiving said hot exhaust gases, (d) independently driven air delivery means effective to conduct a supply of ambient air through said first passages of said heat exchanger for preheating to improve combustion using said ambient air supply, and (e) exhaust gas delivery means effective to sequentially conduct all of the exhaust gases from said furnace through said turbine for adiabatic expansion, to a pressure of about 7.3 psia at a temperature of about 1160° F., thence directly through said second passages of said heat exchanger for releasing heat units, and thence directly through said compressor for elevating the pressure of said gases back to ambient for direct release to atmosphere, whereby a substantial portion of the original waste energy of said exhaust gases may in part be converted to electrical energy and in part redeployed for preheating said ambient air supply for more efficient combustion.

2. The apparatus system as in claim 1, in which the compressor has means to create a vacuum in said exhaust gas delivery means so that the exhaust gases, after having exited from said heat exchanger, are sucked into said compressor, there being little or no back pressure created in said passages through which the exhaust gases flow.

3. The apparatus system as in claim 1, in which said system is arranged to provide a continuous supply of air to said furnace, irrespective of the condition of operation of said compressor-turbine.

4. The apparatus system as in claim 1, in which the exhaust gas temperature supplied to said turbine is in the range of 1200°-1600° F. whereby the necessity for cooling of said exhaust gas delivery means is eliminated.

* * * * *